United States Patent [19]
Bassat et al.

[11] Patent Number: 6,091,742
[45] Date of Patent: Jul. 18, 2000

[54] BI-DIRECTIONAL COMMUNICATIONS PROTOCOL

[75] Inventors: Itzhak Ben Bassat, Ganey Tikva; Dan Ehrenfeld, Tel Aviv, both of Israel

[73] Assignee: Gilant Satellite Networks Ltd., Petach Tikva, Israel

[21] Appl. No.: 09/135,502

[22] Filed: Aug. 17, 1998

[51] Int. Cl.⁷ .................................. H04J 3/06; H04L 7/00
[52] U.S. Cl. .............................................. 370/516; 370/519
[58] Field of Search ...................................... 370/503, 507, 370/508, 516, 517, 519

[56] References Cited

U.S. PATENT DOCUMENTS

| 4,227,214 | 10/1980 | Morito et al. | 358/148 |
|---|---|---|---|
| 4,298,890 | 11/1981 | Lai et al. | 358/158 |
| 4,851,909 | 7/1989 | Noske et al. | 358/149 |
| 5,416,524 | 5/1995 | Citta et al. | 348/471 |
| 5,452,006 | 9/1995 | Auld | 348/390 |
| 5,467,137 | 11/1995 | Zdepski | 348/423 |
| 5,523,795 | 6/1996 | Ueda | 348/480 |
| 5,561,466 | 10/1996 | Kiriyama | 348/423 |
| 5,565,923 | 10/1996 | Zdepski | 348/423 |
| 5,566,174 | 10/1996 | Sato et al. | 370/84 |
| 5,581,181 | 12/1996 | Fuderer | 324/309 |
| 5,602,595 | 2/1997 | Citta et al. | 348/423 |
| 5,606,370 | 2/1997 | Moon | 348/390 |
| 5,610,660 | 3/1997 | Hamano et al. | 348/423 |
| 5,629,958 | 5/1997 | Willming | 375/295 |
| 5,640,388 | 6/1997 | Woodhead et al. | 370/468 |
| 5,651,010 | 7/1997 | Kostreski et al. | 370/537 |
| 5,661,665 | 8/1997 | Glass et al. | 348/423 |
| 5,661,728 | 8/1997 | Finotello et al. | 370/503 |
| 5,668,601 | 9/1997 | Okada et al. | 348/423 |
| 5,671,226 | 9/1997 | Murakami et al. | 370/474 |
| 5,684,804 | 11/1997 | Baronetti et al. | 370/509 |
| 5,686,965 | 11/1997 | Auld | 348/423 |
| 5,694,173 | 12/1997 | Kimura et al. | 348/423 |
| 5,905,732 | 5/1999 | Fimoff et al. | 370/516 |

FOREIGN PATENT DOCUMENTS

| 825773A1 | 2/1998 | European Pat. Off. . |
|---|---|---|
| WO 9735432 | 9/1997 | WIPO . |

*Primary Examiner*—Melvin Marcelo
*Attorney, Agent, or Firm*—Mark M. Friedman

[57] ABSTRACT

In a communications system wherein a sequence of data packets is produced by a packet source and are transmitted as a data stream with a variable jitter, a method for synchronizing a receiving device relative to the sequence of data packets includes providing first and second data packets in the sequence at respective first and second input times. The first data packet is transmitted, and a measure of the jitter associated with the transmission of the first data packet is determined and written into the second data packet. After the second data packet is transmitted, the receiving device, having received the first and second data packets, uses the measure of the jitter in the second data packet to synchronize to the first input time.

22 Claims, 5 Drawing Sheets

BI-DIRECTIONAL COMMUNICATIONS PROTOCOL

FIELD OF THE INVENTION

The present invention relates to communications protocols involving packet statistical multiplexing and more particularly but not exclusively to bi-directional communication using such protocols.

BACKGROUND OF THE INVENTION

Digital video broadcasting (DVB) employs compression protocols such as MPEG. MPEG produces data packets at variable rates, because the rate of data compression is not constant throughout a broadcast but rather depends on the rate of change of details within the frames being sent. In order to multiplex such data efficiently onto a single broadcast channel it is usual to use statistical multiplexing techniques. This allows for the introduction of variable factors affecting the timing of data packet transmission from a sending device to receiving devices.

In order to provide interactive television, or data applications over digital TV channels or satellite, for example Internet browsing, it is necessary for the receiving device to send data packets back to the sending device. Common bi-directional communication protocols, however, require that the receiving device reconstruct a timing signal generated by the sending device and transmit only in synchronization with the timing signal. For example, the Slotted ALOHA protocol, developed at the University of Hawaii, allows data packets to be sent by the receiving device only at the beginning of a time slot defined by the sending device, so that contention between two receiving devices transmitting simultaneously can be resolved with minimal data loss.

In the case of statistically-multiplexed transmissions, however, the receiving unit cannot rely on the times of receipt of the data packets to reconstruct the sending clock, because the times of receipt include the variable delays, or jitters, that were introduced by the multiplexing stage.

SUMMARY OF THE INVENTION

An object of the present invention is to provide a DVB transmission system in which sufficient timing information is made available by the broadcaster for synchronization by receiving parties so that two-way transmission is possible. Such a system should preferably not involve alteration of data that has already been passed through the multiplexing stage.

According to a first aspect of the present invention there is provided a data transmission system wherein data is sent from a data output device according to a transmission clock and wherein jitter is introduced into the timing of the data between the data output device and a data transmission device from which the data is transmitted to a data reception device. Typically the jitter is introduced due to statistical multiplexing of data packets from the data output device with other data packets to be transmitted by the data transmission device. There is provided a feedback link between the data output device and the data transmission device which provides to the data output device an indication as to arrival of data at the data transmission device. This indication enables determination of the jitter, wherein there is further provided a data writing device and wherein said data writing device is operative to add to data that is still in the data output device an indication of the jitter of a preceding packet thus determined.

According to a second aspect of the invention there is provided a data transmission and reception system wherein data is sent from a data output device according to a transmission clock and wherein jitter is introduced into the timing of the data between the data output device and a data transmission device from which the data is transmitted to a data reception device. The system comprises a link between the data output device and the data transmission device which provides to the data output device an indication as to arrival of data at the data transmission device. The indication enables determination of the jitter, and there is further provided a data writing device which is operative to add to data that is still in the data output device an indication of the jitter thus determined.

There is also provided a data reception device for use with the system mentioned above. The device comprises a timer for recording the time of receipt of successive items of data, and a reader for reading said indication of the jitter.

According to an embodiment the data reception device further comprises a reconstructor for reconstructing the transmission clock. The reconstructor is operative to obtain from the timer the times of receipt of successive items of data, and to obtain from the reader the indication of the jitter of each respective item of data, the transmission clock between successive items of data being computed by the reconstructor based on the times of receipt of the successive items of data and the respective jitters.

An embodiment comprises a verifier for verifying the reconstructed clock. The verifier is operative to subtract the jitter from the measured times of receipt and to compare the result to computed transmission clock.

A preferred embodiment is designed for use with the Slotted ALOHA communication protocol.

Preferably either the transmitter, an intermediate station or a receiver is, or is part of, a satellite in orbit around the earth.

In an embodiment the data is video data, which is encoded using an MPEG video standard, preferably the MPEG2 video standard.

A system as described above is advantageous in that embodiments can be built in which data communication is bi-directional.

According to a third aspect of the present invention there is provided a method of bi-directional data communication using a protocol, such as the Slotted ALOHA communication protocol, for transmitting data arranged in sequential packets. The method comprises transmitting data in a first direction from a sending device using a statistically multiplexed channel, monitoring individual data packets as they emerge into the multiplexed channel and recording onto a following data packet the jitter introduced into transmission of the packet by the statistical multiplexing process. The recorded jitters are used at a receiving device, in combination with times of receipt of the packet, to reconstruct the timing of the sending device in transmitting the packets, and using the reconstructed timing to synchronize the sending of data packets in a second direction back to the sending device.

BRIEF DESCRIPTION OF THE DRAWINGS

For a better understanding of the invention and to show how the same may be carried into effect, reference will now be made, purely by way of example, to the accompanying drawings in which.

DETAILED DESCRIPTION OF PREFERRED EMBODIMENTS

Figure 1:
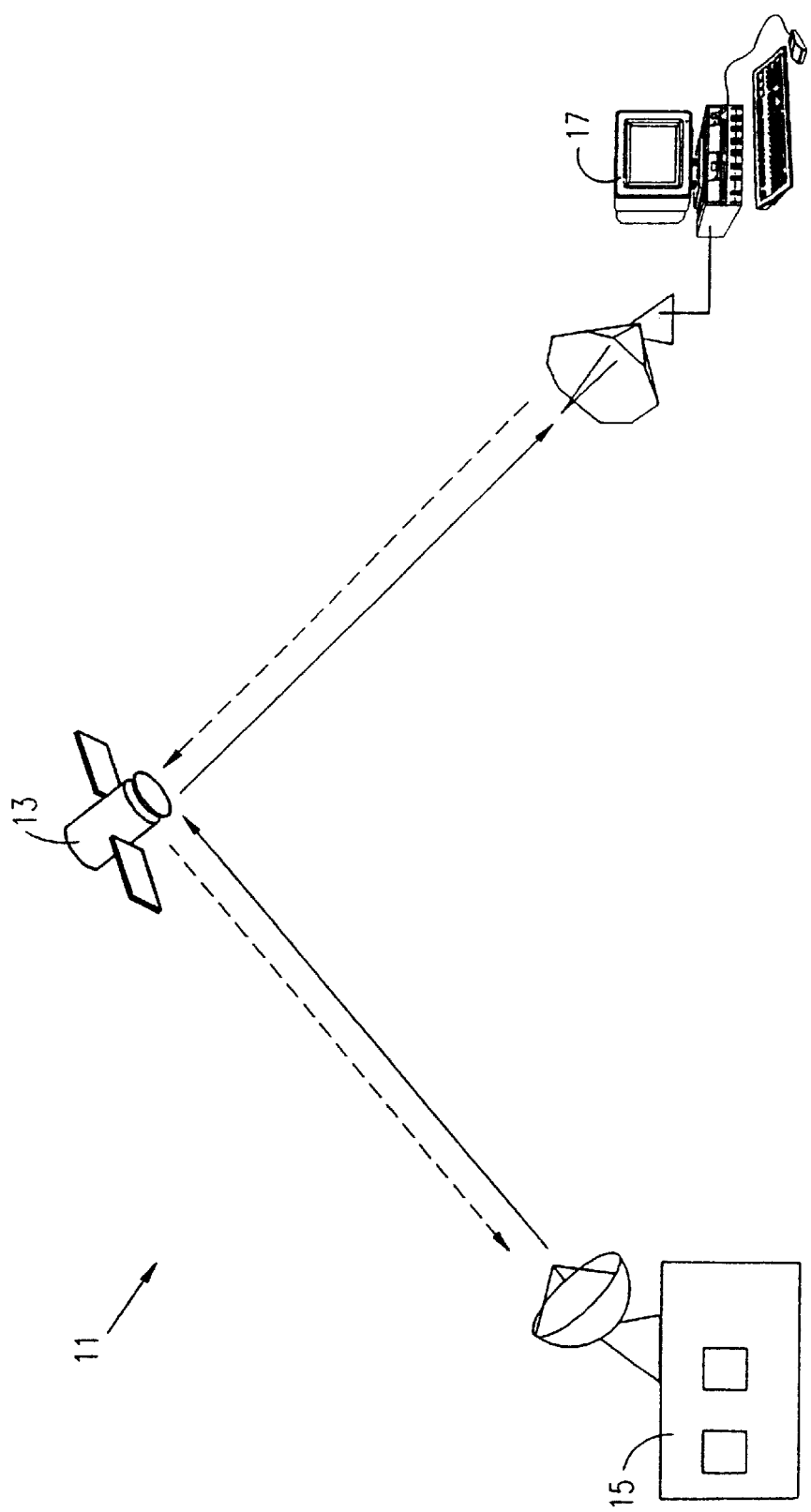
FIG. 1 is a schematic illustration showing a bi-directional satellite broadcast system, in accordance with a preferred embodiment of the present invention.

FIG. 1 is a schematic illustration showing a bi-directional satellite communications system 11, in accordance with a preferred embodiment of the present invention. System 11 comprises a hub 15, or transmission station, which broadcasts packet data, preferably digital video (DVB) data, via a satellite 13. The data are received by one or more VSAT (Very Small Aperture Terminal) devices 17, or other suitable receiving devices. Preferably, satellite 13 is in a geosynchronous orbit, which introduces a known delay between transmission of a signal by hub 15 and its reception at VSAT 17. In any case, methods for determining transmission delays due to satellite transmission are well known in the art, and it is assumed for the sake of the description that follows that the transmission delay in system 11 is known independently of the procedure described hereinbelow for determining packet transmission delays.

Preferably, the data transmitted by hub 15 comprise a stream of MPEG data packets, in which the data are compressed and framed in accordance with standards known in the art. It will be appreciated, however, that the principles of the present invention, as described hereinbelow, may similarly be applied to packet data of other sorts. Each such packet is generated in a successive time slot defined by a clock associated with hub 15.

In addition to receiving the data packets from hub 15, VSAT 17 also transmits data via satellite 13 back to the hub. The transmission of data by VSAT 17 is synchronized with the time slots defined by hub 15, preferably in accordance with the Slotted ALOHA protocol, as described above. Therefore, it is necessary that VSAT 17 have available or be capable of extracting from the data packets the hub clock according to which the time slots are defined, irrespective of any additional delays that may be introduced between generation of the packets in hub 15 and their transmission.

Figure 2:
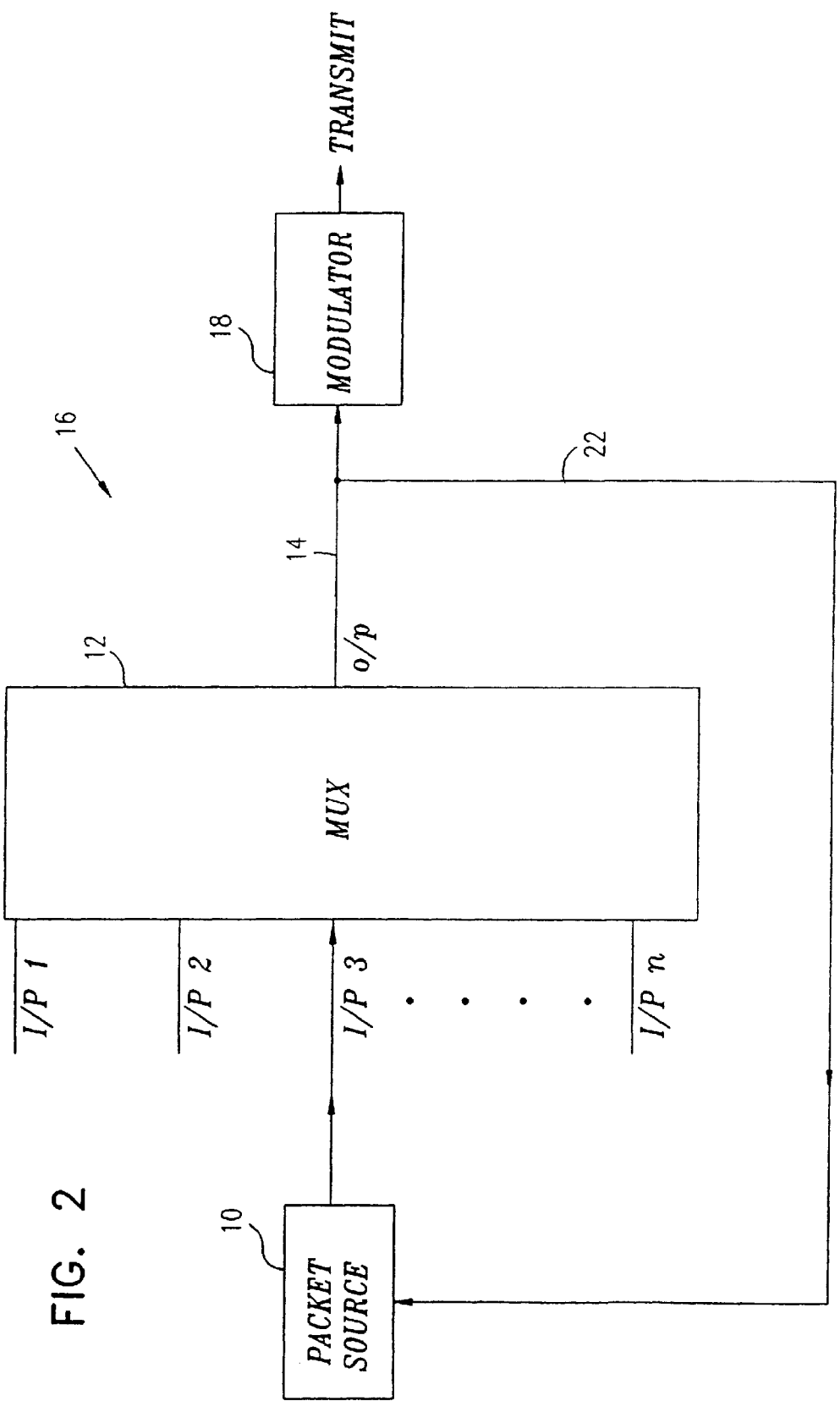
FIG. 2 is a schematic block diagram showing a transmission output device in the system of FIG. 1, arranged in accordance with a preferred embodiment of the present invention.

FIG. 2 shows an output device 16 in hub 15 for transmitting MPEG data arranged in packets, in accordance with a preferred embodiment of the present invention. The device comprises several inputs I/P 1, I/P 2, . . . I/P n. The inputs are generated by dedicated MPEG transport packet data sources 10 (referred to below as data sources, of which only one is shown in the figure), and the data preferably includes video and/or audio data. The inputs I/P 1, I/P 2, . . . I/P n lead to a multiplexer 12 which multiplexes the n input channels onto a single output channel, or data stream, 14. Multiplexer 12 is a general (or statistical) packet multiplexer, and therefore it is not possible to know the precise timing of the appearance of any given data packet in the output stream given the timing of its appearance in the multiplexer input stream. This is because the multiplexer is able to respond to loading levels in the input streams and devote more output space to heavily loaded inputs, cancel null data packets and the like, and buffer data from various input streams until output space is available. The variable delay that is introduced into the timing of the packet is referred to herein as jitter. Once output stream 14 has been formed, the output data are sent to a modulator 18 and transmitted to VSAT 17.

In an embodiment of the present invention, there is a passive monitor 22 of data stream 14, which leads back to MPEG data source 10. This enables source 10 to monitor the output of multiplexer 12 and identify the arrival there of any data packet that it has sent. As it identifies the packet, it is able to make a measure of the jitter based on a clock that was started as the packet was sent. The measured jitter is then written into a control section of the next data packet to be sent, in a way that is generally compatible with MPEG standards. This way the jitter introduced by multiplexer 12 can be monitored and transmitted to receiving device 17 without the need to modify the multiplexer. The output stream is monitored in a passive manner, and no additional delay is introduced into the output stream. Each data source 10 operates independently, and thus any sources in which such monitoring is not required are not penalized.

Figure 3:
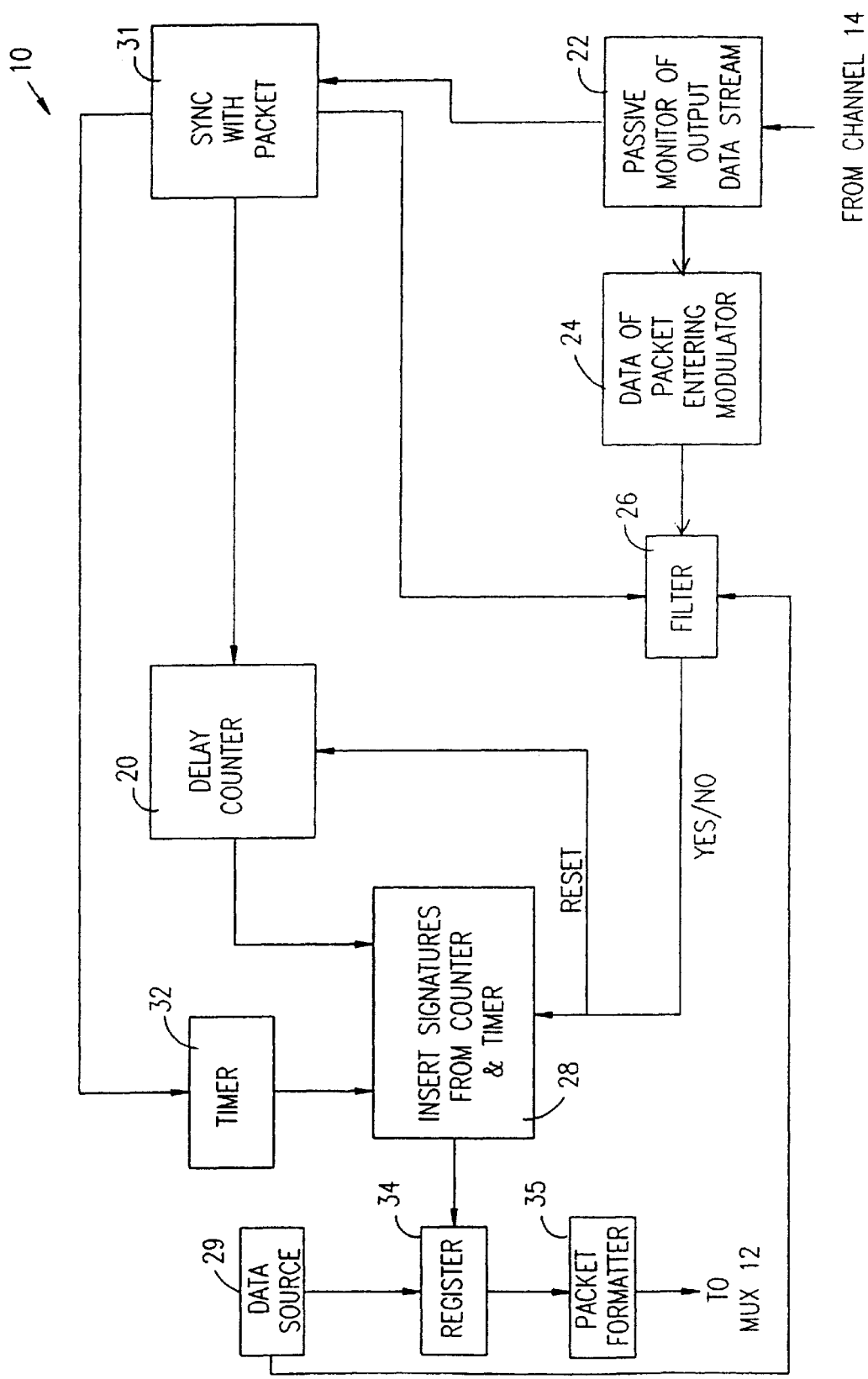
FIG. 3 is a schematic block diagram of part of the device of FIG. 2.

FIG. 3 is a block diagram that schematically illustrates the operation of MPEG packet source 10, in accordance with a preferred embodiment of the present invention in the present invention. A current data packet is first prepared in the normal way at an MPEG data source 29, as is known in the art, and sent via a register 34 to a transport packet formatter 35, and from there to multiplexer 12 for transmission as the current data packet. The current packet, or a part of it, is also input to a filter 26. As the packet is being sent, a delay counter 20 is started. At the same time, passive monitor 22 monitors output stream 14 of multiplexer 12. Data packets 24 from the output stream at the input to modulator 18 are transferred to filter 26, which compares each of the packets to the current packet input from source 29. A synchronizer 31 detects the start time of each data packet received from monitor 22 and accordingly signals a timer 32. While the current data packet is being processed, the next data packet is loaded by source 29 into register 34. The packets are output from packet source 10 to multiplexer 12 at respective times $T_J$ corresponding to time slots of the MPEG transmission, which times are recorded in a data field of the packets reserved for this purpose.

If filter 26 decides that one of data packets 24 matches the current data packet, then an output "yes" is produced. Otherwise an output of "no" is produced. The yes/no output of the filter 26 is sent to a time signature writer 28 which is arranged to add a time data signature to the next data packet in register 29, in a suitable, predetermined data field, as described above. Delay counter 20 receives timing signals from synchronizer 31 and notifies writer 28, which monitors the amount of time elapsed since the current data packet was sent to the multiplexer using a clock signal from timer 32. When the "yes" signal is received from filter 26, writer 28 writes the elapsed time to the next data packet in register 34. The signature writer also preferably adds to the signature the actual hub time from timer 32. At the same time counter 20 is reset. The packet sent to multiplexer 12 thus includes a time $T_j$ at which the packet was dispatched by packet source 10 and a jitter $\Delta T_{j-1}$ determined with respect to the preceding packet (except for the first packet in a given transmission, which includes no jitter information).

Figure 4:
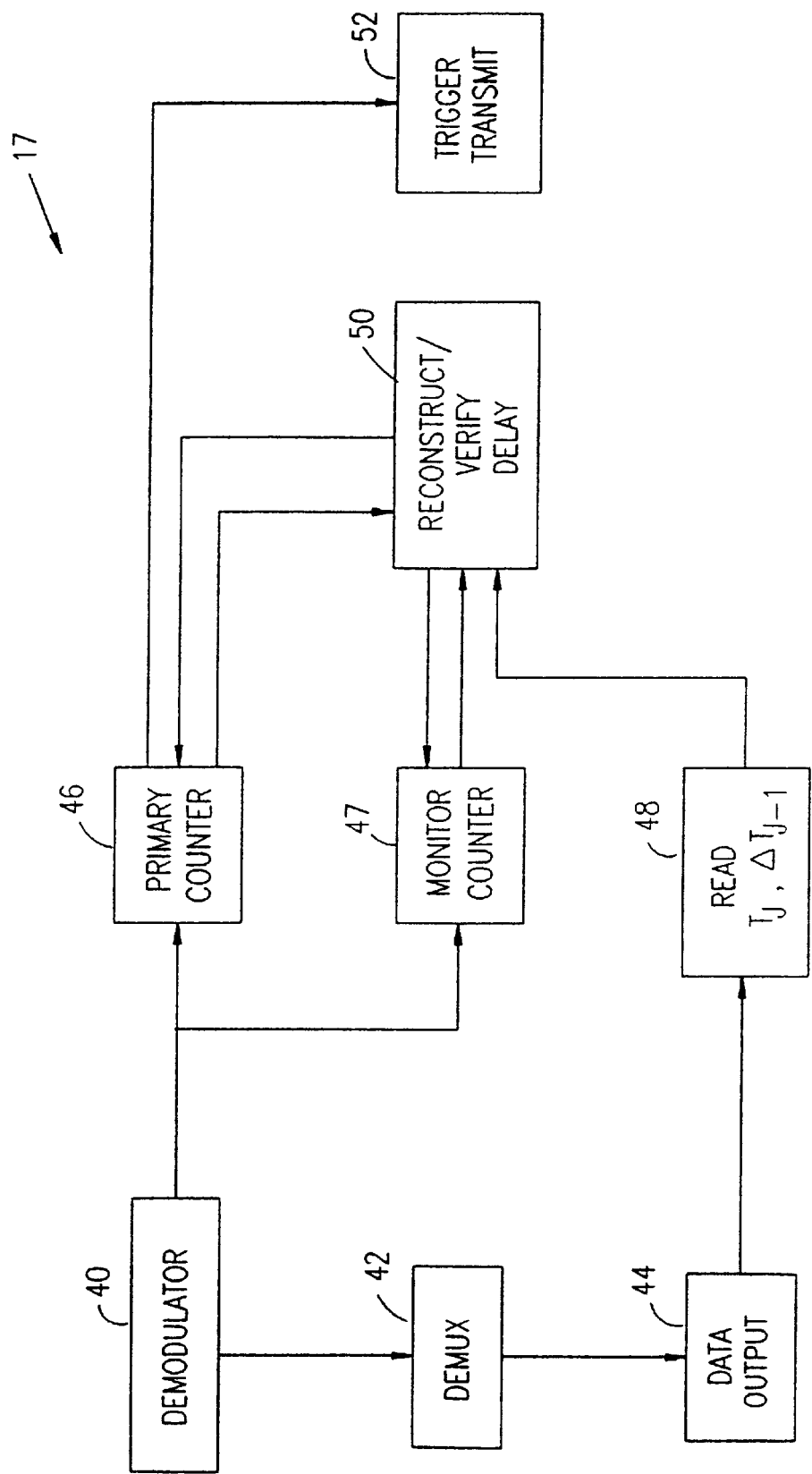
FIG. 4 is a schematic block diagram showing a receiving device in the system of FIG. 1, in accordance with a preferred embodiment of the present invention.

FIG. 4 is a schematic block diagram showing details of VSAT 17, in accordance with a preferred embodiment of the present invention. The jitter information included in the control data of the next data packet enables VSAT 17 to reconstruct the actual times at which the packets were dispatched by packet source 10, so that the VSAT can send messages back to hub 15 in synchronization with the hub time slots. The data stream transmitted by the hub is received and demodulated by a demodulator 40, and a data output 44 comprising selected data packets (including the jitter information) is demultiplexed from the data stream by a demultiplexer 42. For each packet, a data reader 48 reads the time and jitter data, $T_j$ and $\Delta T_{j-1}$, in the packet. A primary counter 46 derives a system clock from the data stream, corresponding to the times of transmission of data packets from hub 15, and outputs the clock to a delay reconstructor/verifier 50.

Reconstructor/verifier 50 uses the clock from counter 46 to determine an interval $T_j'$ between arrival of the current packet at VSAT 17 and that of the preceding packet, which corresponds to the difference in the times at which the packets were output to modulator 18. The determined interval is used together with the time and jitter information from reader 48 to reconstruct the slot clock of packet source 10, i.e., to reconstruct the actual, correct synchronization clock of the time slots of the packets prepared at the source. Typically, as described hereinbelow, the corrected clock is reconstructed after only two packets (sent at times $T_0$ and $T_1$) have been received by the VSAT. Reconstructor/verifier 50 outputs the corrected clock to primary counter 46 and to a monitor counter 47. The monitor counter is used to verify that the corrected clock remains synchronized with the actual time at which each packet was output to modulator 18, preferably by subtracting the received jitter data $\Delta T_j$ from the time at which the packet was actually received at VSAT 17, and checking the result against the corrected clock. If there is any discrepancy, reconstructor/verifier 50 resets primary counter 46 accordingly.

The corrected clock from primary counter 46 is input to a transmission trigger 52, which gates transmission of messages sent by VSAT 17 back to hub 15. Preferably, the messages are sent at the beginning of each of the slots, in accordance with the Slotted ALOHA protocol, for example. Since the time slots of the output packets are preferably all of a known duration, in accordance with MPEG standards, it is not necessary for reconstructor/verifier 50 to reconstruct all of the time slots. Preferably, however, the jitter information in subsequent packets is used as described hereinabove to verify that synchronization of trigger 52 is maintained.

Figure 5:
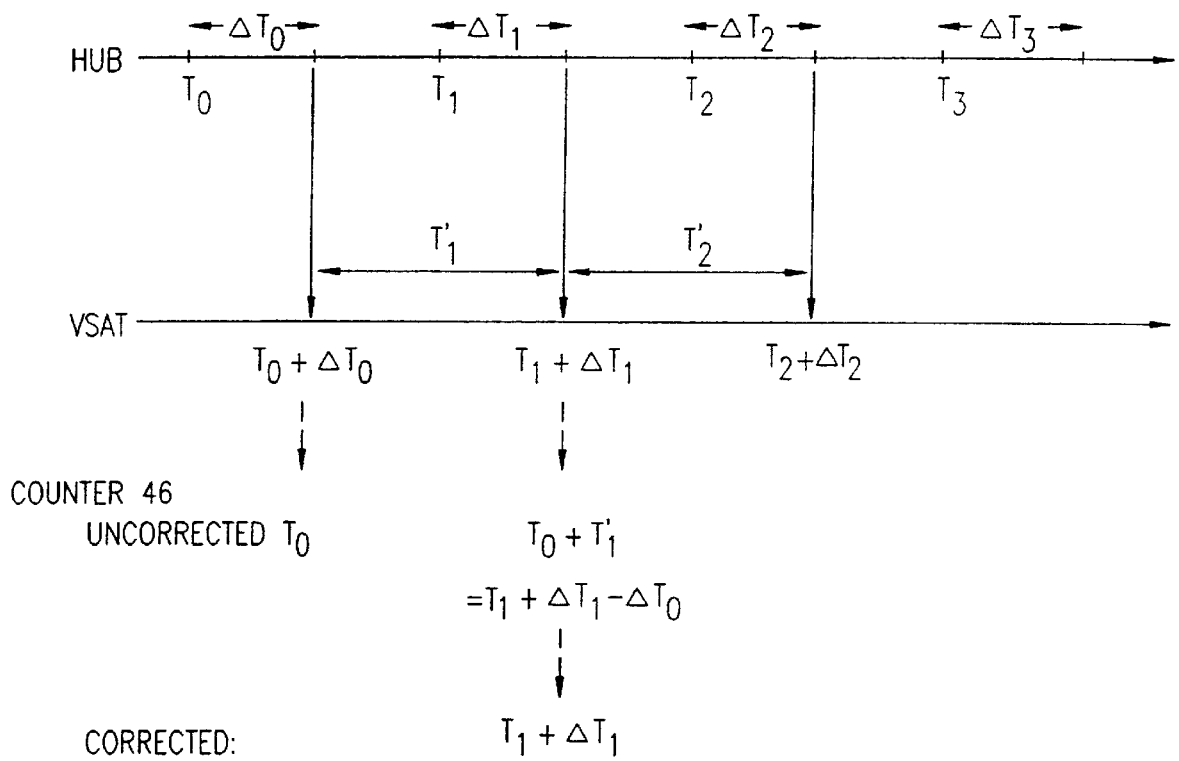
FIG. 5 is a timing diagram showing a transmission procedure in accordance with a preferred embodiment of the present invention.

FIG. 5 is a timing diagram useful in understanding the operation of packet source 10 and VSAT 17 in transmission of data packets between hub 15 and the VSAT, in accordance with a preferred embodiment of the invention. In this figure, $T_n$ indicates the time at which the nth data packet is output by packet source 10. $\Delta T_n$ indicates the variable delay introduced by multiplexer 12 into the sending of the packet, that is to say it represents the time between output of the packet by source 10 and its receipt in modulator 18. The nth packet does not actually leave hub 15 until $T_n + \Delta T_n$. It is assumed that the packet is then received instantly by VSAT 17, since the transmission delay via satellite 13 is known, as noted hereinabove, and can be canceled out of the calculation. $T_n'$ denotes the interval between the sending (or receiving) of the nth packet and the (n-1)th packet to modulator 18. Although the packets are output by source 10 to multiplexer 12 at known intervals, $T_n'$ will vary unpredictably according to the variation in delay from packet to packet, in accordance with the formula: $T_n' = T_n - T_{n-1} + \Delta T_n - \Delta T_{n-1}$. (For n=0, $\Delta T_{n-1}$ is taken to be zero.) As noted earlier, the value of $T_n - T_{n-1}$ is known, given by the duration of the time slots generated by packet source 10.

Preferably, $\Delta T_n$ is represented as a modulo value, having a module equal to the number of ticks of hub timer 32 in a single time slot. By representing $\Delta T_n$ in this form, it is possible to reduce the size of the data field allocated in each packet to the delay value. Since the purpose of conveying the delay value to VSAT 17 is to allow the VSAT to synchronize its transmission with the beginning of any time slot, and it does not matter with which time slot the transmission is synchronized, it is sufficient to transmit the modulo, rather than the full numerical value of delays that may exceed the duration of one time slot.

VSAT 17 reconstructs the time slot synchronization of packet source 10 using $T_n'$, which is determined empirically by the VSAT based on the arrival times of the packets at the device, and the values of $\Delta T_n$ and $\Delta T_{n-1}$ transmitted as data in the packets sent from hub 15 to VSAT 17. As shown in FIG. 5, the first packet arrives at the device at a time $T_0 + \Delta T_0$, but $\Delta T_0$ is still unknown at this time. The value of $\Delta T_0$ is received by device 17 only at time $T_1 + \Delta T_1$, when the second packet is received at VSAT 17. Now the empirical arrival time of the first packet and its delay value $\Delta T_0$ are used together by reconstructor 50 to find the actual, corrected time $T_0$ at which the first packet was output by source 10. Trigger 52, which receives the corrected time from primary counter 46, counts ahead from $T_0$ using the same modulo basis as that described above with reference to $\Delta T_n$. Thus, at the beginning of each time slot, the modulo is equal to zero, and trigger 52 enables transmission of a message from VSAT 17 at that time.

A check on the above calculation is as follows: The empirical interval between the first and the second packets, $T_1'$, is determined by subtracting the times of actual receipt of the two packets. The result of this calculation, in modulo, should give the difference between the two adjacent jitters: $\mathrm{mod}(\Delta T_1 - \Delta T_0)$. In this manner, reconstructor/verifier 50 verifies the determination of the delay. Preferably, such verification is performed subsequently for each of the packets received by VSAT 17, and any offset in the timing of trigger 52 that may be discovered in this manner is corrected.

As noted hereinabove, the reconstructed time slot clock is preferably used to synchronize data packets for sending on the return path back to hub 15. If the data packets are MPEG2 packets or any other form of data packet comprising video signals, then the principles of the present invention may be used as a means of providing interactive (or two-way) television for such purposes as videoconferencing. As mentioned above, the system is particularly suitable for use with the Slotted ALOHA communication protocol, which is widely used in satellite communications. Thus, the preferred embodiments of the invention allow interactive television to be provided over a satellite communication channel.

As monitoring is carried out passively by monitor 22 on the output of multiplexer 12, embodiments of the present invention do not require replacement or modification of the multiplexer in order to operate. Thus, conversion of existing equipment to use the system of the present invention is a relatively straightforward matter, generally requiring only that packet source 10 be suitably modified to determine and transmit values of the packet transmission delay, and that VSAT 17 be programmed to read and make use of the delay values, as described hereinabove. Although the preferred embodiment described hereinabove makes reference to hub 15 and VSAT 17, it will be appreciated that the principles of the present invention may equally be applied to bi-directional communications systems using transmitting and receiving devices of other types.

The above description is by way of example only. The scope of the invention is as defined in the appended claims. It is appreciated that the various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

What is claimed is:

1. In a communications system wherein a sequence of data packets is produced by a packet source and are transmitted as a data stream with a variable jitter, a method for synchronizing a receiving device relative to the sequence of data packets, comprising:

providing first and second data packets in the sequence at respective first and second input times;

transmitting the first data packet and determining a measure of the jitter associated with the transmission of the first data packet;

writing the measure of the jitter of the first data packet into the second data packet; and transmitting the second data packet, whereby the receiving device receives the first and second data packets and uses the measure of the jitter in the second data packet to synchronize to the first input time.

2. A method according to claim 1, wherein providing the first and second data packets comprises providing MPEG data, and wherein writing the measure of the jitter comprises writing the measure in an MPEG data field.

3. A method according to claim 1, wherein determining the measure of the jitter comprises passively sampling the data stream.

4. A method according to claim 3, wherein determining the measure of the jitter comprises filtering the sampled data stream to determine a delay at which the first data packet appears in the sampled data stream.

5. A method according to claim 3, wherein providing the first and second packets comprises inputting the packets to a multiplexer, and wherein passively sampling the data stream comprises sampling an output of the multiplexer.

6. A method according to claim 1, wherein writing the measure of the jitter comprises writing a modulo of the determined measure.

7. A method according to claim 1, wherein transmitting the first and second data packets comprises transmitting packets via a satellite link.

8. A method according to claim 1, and comprising:

receiving the first and second data packets and monitoring a time of receipt of the first packet;

reading the measure of the jitter of the first data packet written into the second data packet; and reconstructing a synchronization of the input time of the first data packet using the time of receipt and the measure of the jitter of the packet.

9. A method according to claim 8, and comprising transmitting a message synchronized with one of the input times in the sequence responsive to the reconstructed synchronization.

10. A method according to claim 9, wherein transmitting the message comprises transmitting a message in a time slot corresponding to the one of the input times in accordance with a Slotted ALOHA protocol.

11. A method according to claim 8, and comprising determining a measure of the jitter of the second data packet and providing and transmitting a third data packet in the sequence, into which a measure of the jitter of the second data packet is written, and verifying the synchronization of the input time of the first data packet using the measures of the jitters of the first and second data packets.

12. In a communications system wherein a sequence of data packets is produced by a packet source and is transmitted as a data stream with a variable jitter, apparatus for data transmission, comprising:

a monitor, which samples the packets in the data stream;

a delay counter, which determines a delay between transmission of a first one of the packets in the data stream and an input time at which the first one of the packets was produced; and a signature writer, which writes the delay determined by the delay counter into a second, subsequent one of the packets produced by the packet source, whereby a receiving device in the communications system receives the first and second packets and uses the delay written in the second data packet to determine the input time of the first one of the packets.

13. Apparatus according to claim 12, wherein the monitor samples the packets in the data stream substantially without altering data therein.

14. Apparatus according to claim 12, and comprising a multiplexer to which the sequence of data packets is input, and wherein the monitor samples an output of the multiplexer.

15. Apparatus according to claim 12, and comprising a filter, which compares the sampled packets from the data stream to the first one of the data packets so as to determine a time of transmission of the first one of the data packets, and which responsive to the comparison outputs an indication of the time of transmission to the signature writer.

16. Apparatus according to claim 12, and comprising a transmitter, which transmits the data stream to a receiving device via a satellite.

17. Apparatus according to claim 12, wherein the data packets comprise MPEG data packets, and wherein the signature writer writes the delay into an MPEG data field in the second one of the packets.

18. In a communications system wherein a sequence of data packets is produced by a packet source at respective input times and is transmitted as a data stream with a variable jitter of the packets relative to the respective input times, and wherein a measure of the jitter associated with a first one of the data packets in the sequence is written into a second, subsequent one of the packets, apparatus for synchronizing a receiving device relative to the sequence of data packets, comprising:

a receiver, which receives the data stream including the first and second data packets;

an arrival monitor, which determines a time of receipt of the first data packet at the receiving device; and a reconstructor, which reads the measure of the jitter from the second data packet and reconstructs a synchronization of the input time of the first data packet using the measure of the jitter and the time of receipt from the arrival monitor.

19. Apparatus according to claim 18, wherein the data packets comprise MPEG data packets, and wherein the reconstructor reads the measure of the jitter that is written an MPEG data field in the second one of the packets.

20. Apparatus according to claim 18, wherein the receiver receives a third data packet including a measure of the jitter associated with the second data packet and the arrival monitor determines a time of receipt of the second data packet, and wherein the reconstructor verifies the synchronization using the measures of the jitter associated with the first and second data packets.

21. Apparatus according to claim 18, and comprising a transmitter, which transmits a message synchronized with one of the input times of the data packets in the sequence responsive to the reconstructed synchronization.

22. Apparatus according to claim 21, wherein the transmitter transmits the message in a time slot corresponding to the one of the input times in accordance with a Slotted ALOHA protocol.

* * * * *

UNITED STATES PATENT AND TRADEMARK OFFICE
CERTIFICATE OF CORRECTION

PATENT NO.: 6,091,742
DATED: July 18, 2000
INVENTOR(S): Itzhak Ben-Bassat It is certified that error appears in the above-identified patent and that said Letters Patent is hereby corrected as shown below:

On the Title Page

- [19] Last Name of Inventor: BEN-BASSAT

-[73] Assignee: Gilat Satellite Networks Ltd.

Signed and Sealed this

Tenth Day of April, 2001

*Attest:*

NICHOLAS P. GODICI

*Attesting Officer*   *Acting Director of the United States Patent and Trademark Office*